United States Patent [19]

Roberg

[11] Patent Number: 5,833,533
[45] Date of Patent: Nov. 10, 1998

[54] HARVESTER THRESHER

[75] Inventor: Alfons Roberg, Harsewinkel, Germany

[73] Assignee: Class KGaA, Harsewinkel, Germany

[21] Appl. No.: 852,539

[22] Filed: May 7, 1997

[30] Foreign Application Priority Data

May 9, 1996 [DE] Germany .................. 196 18 682.6

[51] Int. Cl.⁶ .......................... A01F 12/40; A01F 29/06
[52] U.S. Cl. .................. 460/112; 56/504; 460/113
[58] Field of Search .................................. 460/111, 112, 460/113, 116, 119, 901; 56/504, 505

[56] References Cited

U.S. PATENT DOCUMENTS

| 3,669,122 | 6/1972 | Rowland-Hill | 460/113 X |
| 4,637,406 | 1/1987 | Guinn et al. | 460/112 |
| 4,646,757 | 3/1987 | Schmitt et al. | 460/112 |

FOREIGN PATENT DOCUMENTS

4321905A1   1/1995   Germany .

Primary Examiner—Terry Lee Melius
Attorney, Agent, or Firm—Michael J. Striker

[57] ABSTRACT

A harvester thresher has a housing, a straw shaking means, a chopper drum arranged after the straw shaking means and provided with associated counter cutters for comminuting a threshed straw, a width distributing device arranged under the chopper drum for distributing the comminuted straw, the chopper drum being arranged at a height of the discharge end of the straw shaking means, the chopper drum having a drum casing, a shaft supporting the drum casing in the housing, and a plurality of parallel supporting rings arranged at a distance from one another on the drum casing, the chopper drum further having a plurality of impact plates, a plurality of transfer strips associated with the straw shaking means and inserted in ring gaps between the supporting rings, and a plurality of counter cutters which deviate under the action of an overload and extend in the ring gaps between the supporting rings at a different location.

12 Claims, 5 Drawing Sheets

HARVESTER THRESHER

BACKGROUND OF THE INVENTION

The present invention relates generally to a harvester thresher.

More particularly, it relates to a harvester thresher which has straw shakers and a chopper drum arranged after the straw shakers and having associated counter-cutters for comminuting the threshed straw.

Harvester threshers of the above mentioned general type are known in the art. One of such harvester threshers is disclosed in the German document DE-OS 43 21 905 of the applicant. It is believed that the known harvester thresher can be further improved.

SUMMARY OF THE INVENTION

Accordingly, it is an object of the present invention to provide a new harvester thresher which is a further improvement of the existing harvester threshers of this type.

More particularly, it is an object of the present invention to provide a harvester thresher in which with known mounted choppers with articulately suspended flail-type cutters, unproportionally high drive power is substantially reduced by new construction and positioning.

In keeping with these objects and with others which will become apparent hereinafter, one feature of present invention resides, briefly stated, in a harvester thresher in which a chopper drum is arranged at the height of a discharge end of the straw shaker and includes parallel and spaced supporting rings which are positioned on a drum casing supported in the harvester thresher housing through a shaft, and associated impact plates arranged at the location of the previously known flail-type cutters, and transfer strips provided on the shaker ends engage both in an angular gap between the supporting rings as well as in the region of a closing hood of the harvester thresher with a counter-cutter which is arranged so as to deviate under overload.

When the harvester thresher is designed in accordance with the present invention, it provides for the above mentioned highly advantageous results.

In accordance with another feature of the present invention, the closure hood with the counter cutter is supported on the harvester thresher housing turnably through an axle.

At least a part of the casing plate which surrounds the chopper drum together with the counter-cutter and the closure hood can be turnable about the axle when it is necessary to discharge the chopped straw in swath as desired.

The casing plate can be a component of the closure hood and therefore turnable together with the latter about the axle. On the other hand, the casing plate can be turnable about its own axle in the closure hood.

A straw guiding drum provided with prongs can be arranged above the chopper drum. Stripping strips can be arranged at the lower end of the housing of the harvester thresher. They can be foldable in the lower peripheral region of the chopper drum about an axle, and turnable into the intermediate space of the supporting rings.

Finally, L-shaped supporting arms can be arranged at both sides of the closure hood turnably about the axle, and a width distributing device for the comminuted straw can be mounted on the supporting arm on their free legs and can include a transfer funnel, a throwing blower and an ejecting pipe.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
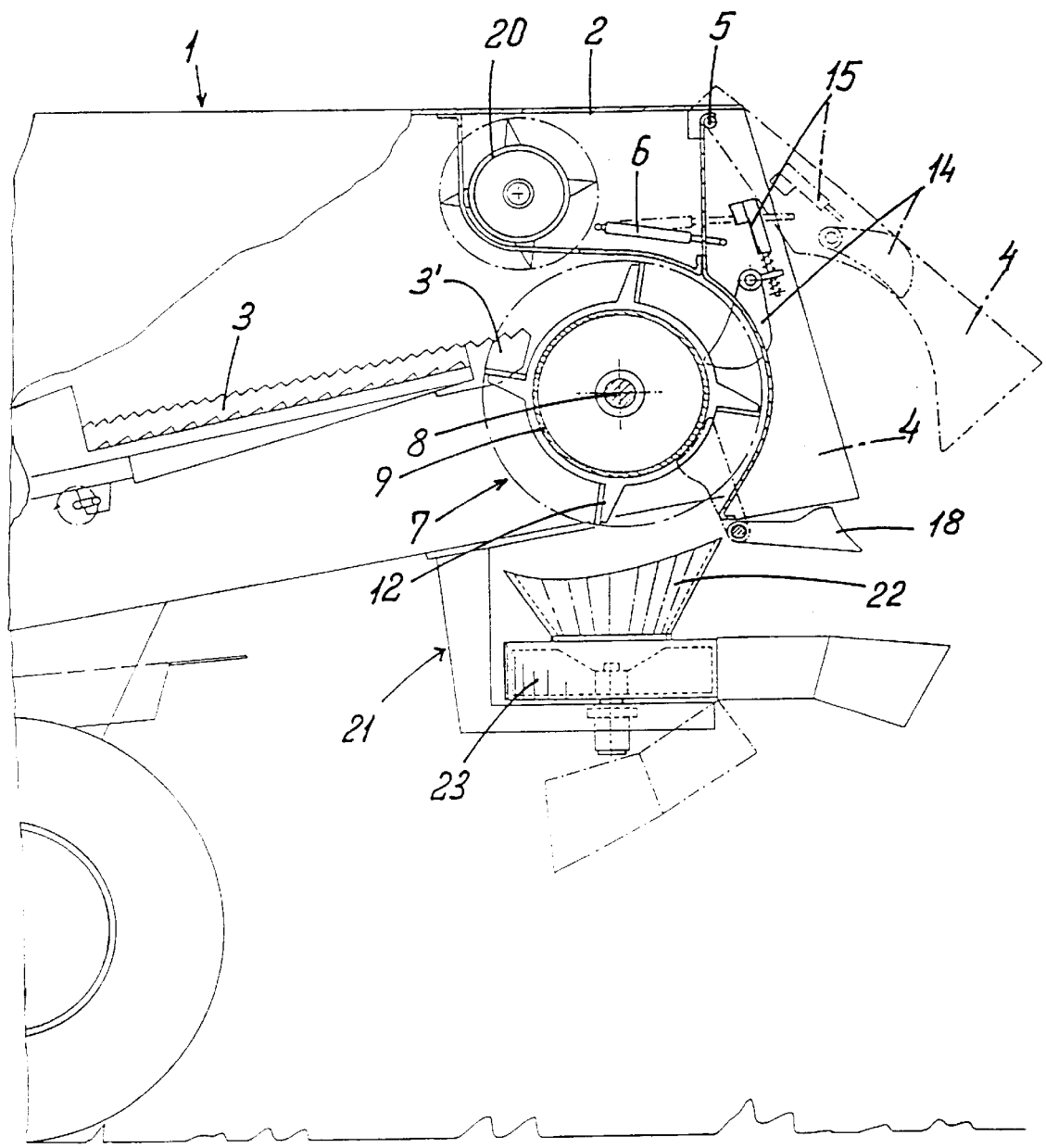
FIG. 1 is a schematic side view of a discharge end of a harvester thresher with a mounted chopper in accordance with the present invention.

A harvester thresher in accordance with the present invention is identified as a whole with reference numeral 1 and has a housing 2. Shakers 3 are arranged in the housing and provided with transferring strips 3' at their discharge ends. The harvester thresher further has a closure hood 4 which is mounted turnably on the housing 2 through an axle and an adjusting member 6.

A chopper drum 7 is arranged at the height of a discharge end of the shakers 3. It has a shaft identified with reference numeral 8. The shaft 8 is rotatably supported in the housing 2 and carries a cylindrical drum casing 9. Supporting rings 10 are arranged on the outer surface of the drum casing 9 and distributed over the total inner width of the housing 2 with distances from one another. The supporting rings include a base part 11 which extends over 360°, and a plurality of impact or drive plates 12 which are distributed on the periphery of the base part 11. The impact or drive plates 12 extend over the width of the drum 7 and are angularly distributed over the periphery. The transfer strips 3' which are associated with the shaker 3 extend into a ring gap 13 between two neighboring supporting rings 10 on the one hand, while counter-cutters also extend into the ring gap 13 between the neighboring supporting ring 10 at another location.

Figure 2:
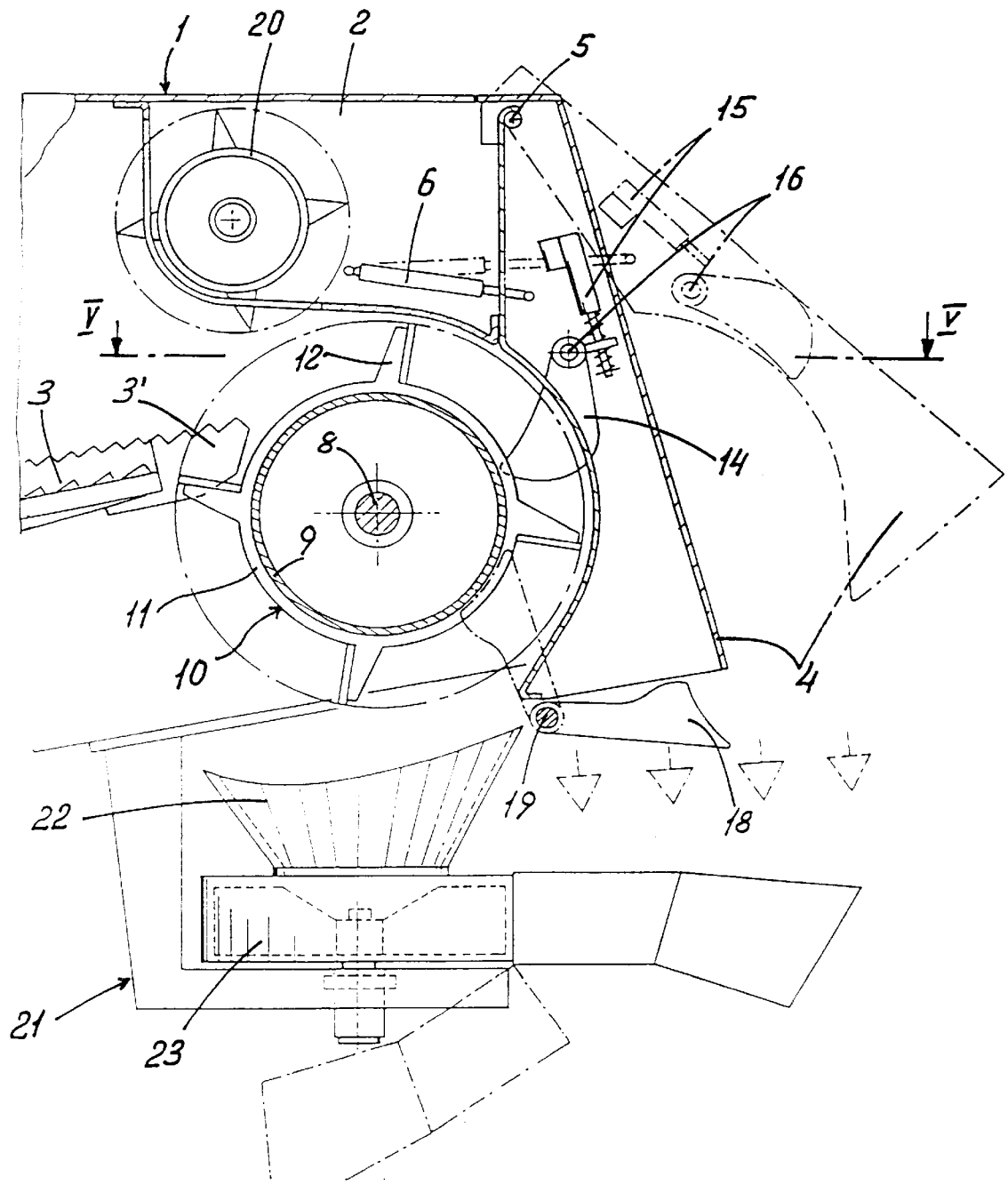
FIG. 2 is a view showing a portion of FIG. 1 on an enlarged scale.
Figure 3:
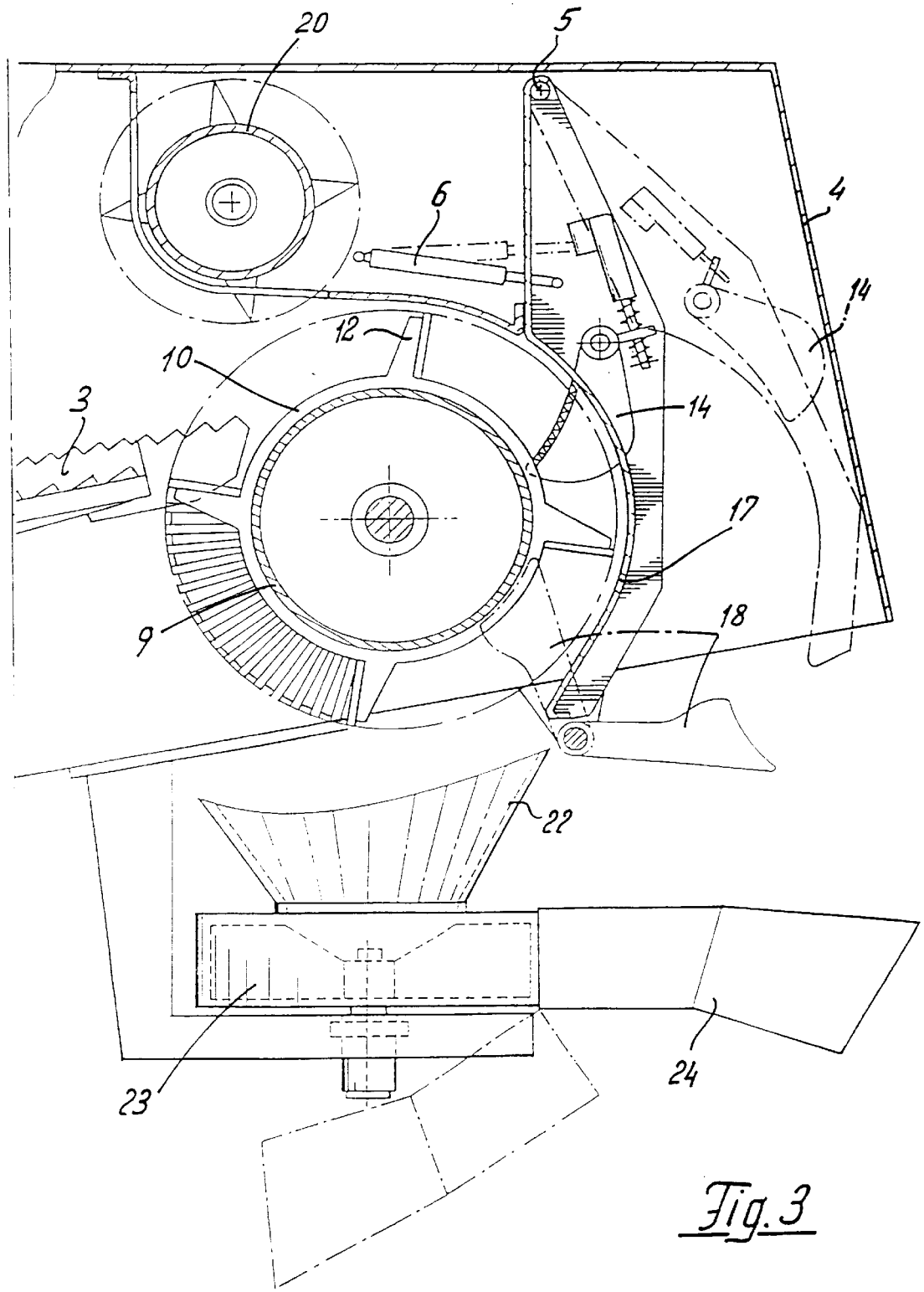
FIG. 3 is a side view of the inventive harvester thresher in accordance with a different embodiment of the invention.

The counter-cutters are supported deviatingly in the closure hood 4 under the action of a pressure accumulator 15 so as to rotate about an axle 16 under the action of foreign bodies. A partially slotted casing plate 17 is associated with the chopper drum 7 at its upper and rear periphery. The counter-cutters 14 can pass through it and turn at least partially together with the closure hood 4 when the chopper drum is not in operation and the straw must be discharged without being chopped in a swath. For this purpose, also stripping strips 18 are stationary supported in the housing 2 through associated axle 19 in the ring gap 13 between the supporting rings so as to fold in, as shown by dash-dot lines in FIGS. 1 and 2.

A prong drum 20 arranged above the chopper drum 7 facilitates the transfer of the straw which comes from the shakers 3 into the region of the chopping aggregate. A width distributing device 21 for the chopped product is arranged under the chopper drum 7. It includes a transfer funnel 22, a throwing blower 23, and an expelling pipe 24.

Figure 4:
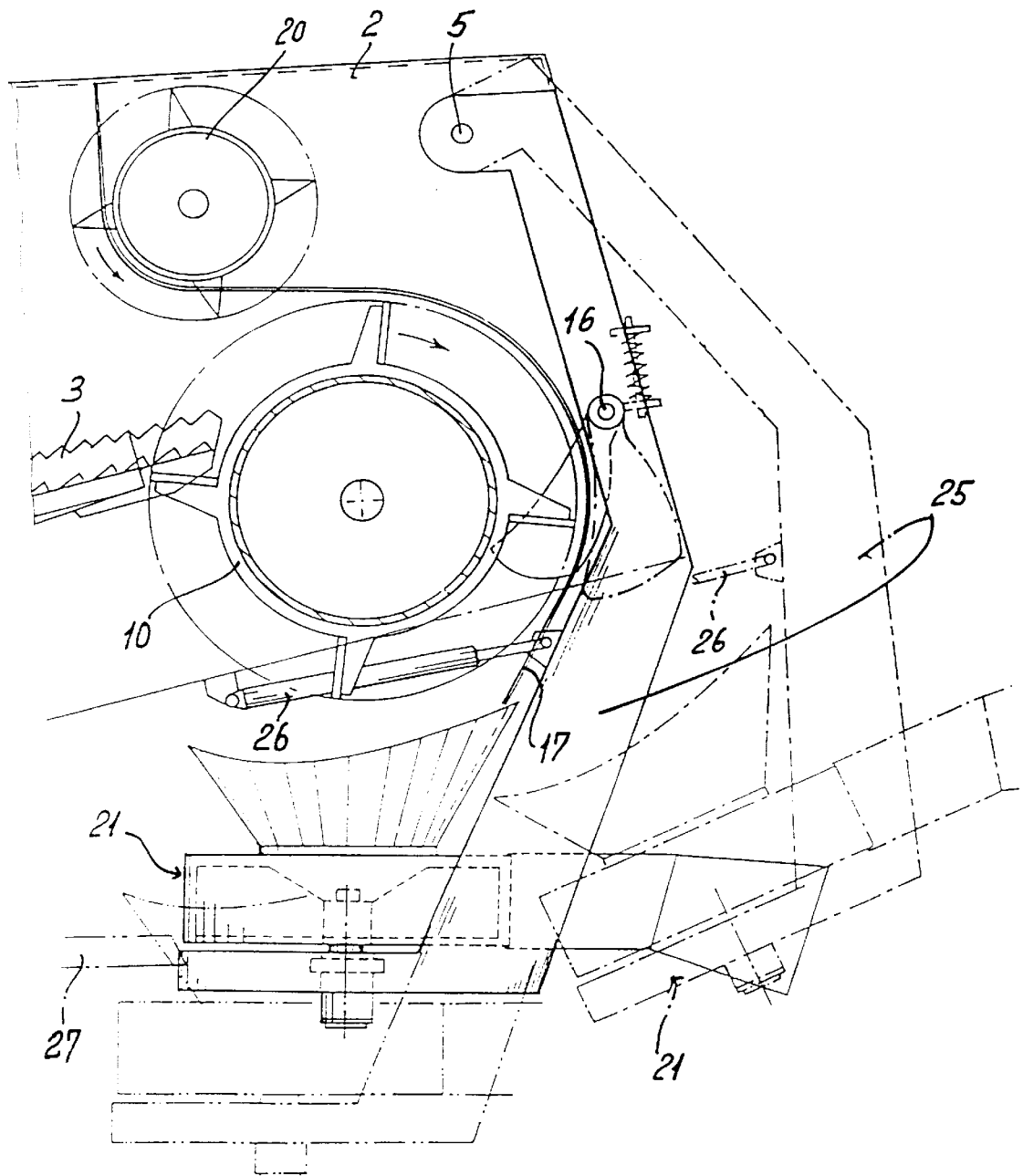
FIG. 4 is a view showing a further variation on a side view and with a completely turnable width distributing device.
Figure 5:
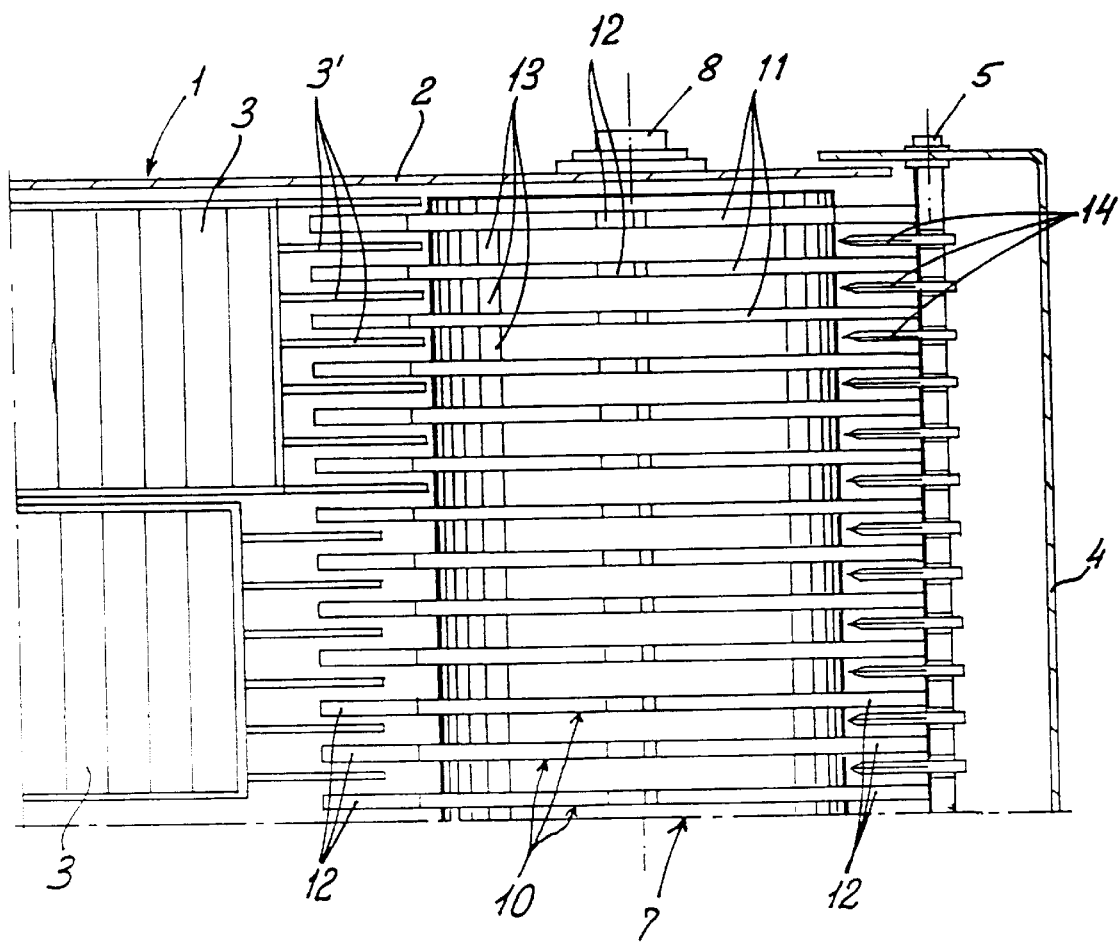
FIG. 5 is a view showing a partial section taken along the line V—V in FIG. 2, on a plan view.

FIG. 4 shows a structural modification in which L-shaped supporting arms 25 are arranged at both sides of the closure hood 4. At their lower end they carry a width distributing device 21 turnably about the axle 5. The casing plate 17 which is partially slotted or in some cases composed of two parts does not take part in this embodiment in the possible turning movement of the L-shaped supporting arms 25 and operates as a stationary element for guiding the chopped straw to be discharged as a swath. The association of the stripping strips 18 is also possible in this construction. The turning movement for the supporting arms 25 is releasable by a correspondingly stable adjusting member 26 which is mounted at one end with the lower housing 2. The chaff can be introduced into the width distributing device 21 by a sieve box extension 27.

It will be understood that each of the elements described above, or two or more together, may also find a useful application in other types of constructions differing from the types described above.

While the invention has been illustrated and described as embodied in harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A harvester thresher, comprising a housing; straw shaking means having a discharge end; a chopper drum arranged after said straw shaking means and provided with associated counter cutters for comminuting a threshed straw; a width distributing device arranged under said chopper drum for distributing the comminuted straw, said chopper drum being arranged at a height of said discharge end of said straw shaking means, said chopper drum having a drum casing, a shaft supporting said drum casing in said housing, and a plurality of parallel supporting rings arranged at a distance from one another on said drum casing, said chopper drum further having a plurality of impact plates; a plurality of transfer strips associated with said straw shaking means and inserted in ring gaps between said supporting rings, said counter cutters deviating under the action of an overload and extending in said ring gaps between said supporting rings at a different location.

2. A harvester thresher as defined in claim 1, wherein said straw shaking means have an end, said transfer strips being arranged at said end of said straw shaking means.

3. A harvester thresher as defined in claim 2; and further comprising a closure hood, said counter-cutters being arranged in a region of said closure hood.

4. A harvester thresher as defined in claim 3, wherein said closure hood with said counter-cutters are supported on said housing turnably about an axis.

5. A harvester thresher as defined in claim 1, wherein said chopper drum has an upper and a rear periphery; and further comprising a partially slotted casing plate which guides a chopped product and surrounds said upper and said rear periphery of said chopper drum, said counter-cutters passing through said casing plate.

6. A harvester thresher as defined in claim 3, wherein said chopper drum has an upper and a rear periphery; and further comprising a partially slotted casing plate which guides a chopped product and surrounds said upper and said rear periphery of said chopper drum, said counter cutters passing through said casing plate, at least a part of said casing plate together with said counter-cutters and said closure hood being turnable about an axis so as to discharge the straw as a swath.

7. A harvester thresher as defined in claim 3, wherein said chopper drum has an upper and a rear periphery; and further comprising a partially slotted casing plate which guides a chopped product and surrounds said upper and said rear periphery of said chopper drum, said counter-cutters passing through said casing plate, said casing plate being a component of said closure hood and turnable together with said closure hood about an axis.

8. A harvester thresher as defined in claim 3, wherein said chopper drum has an upper and a rear periphery; and further comprising a partially slotted casing plate which guides a chopped product and surrounds said upper and said rear periphery of said chopper drum, said counter-cutters passing through said casing plate, said casing plate being supported turnably about an axis in said closure hood.

9. A harvester thresher as defined in claim 1; and further comprising a straw guiding drum arranged above said chopper drum and provided with a plurality of prongs.

10. A harvester thresher as defined in claim 1, wherein said housing has a lower end; and further comprising a plurality of stripping strips arranged at said lower end of said housing and turnable around an axis in a lower peripheral region of said chopper drum, said stripper strips being turnable into intermediate spaces between said supporting ring.

11. A harvester thresher as defined in claim 1; and further comprising a closure hood; and L-shaped supporting arms arranged at both sides of said closure hood and turnable about an axis, said supporting arms having lower free legs which support said width distributing device.

12. A harvester thresher as defined in claim 11, said width distributing device includes a transfer funnel, a throwing blower, and an ejection pipe.

* * * * *